United States Patent
Chisholm et al.

[11] Patent Number: 5,919,377
[45] Date of Patent: Jul. 6, 1999

[54] SYSTEM FOR TRANSPORTING SOLID MATERIALS

[75] Inventors: Andrew Chisholm, Columbus, Ohio; Samuel Louis Bean, Arden, Del.; Mark David Dulik, West Chester, Pa.; Peter Anthony Monopoli, Wilmington, Del.

[73] Assignee: General Chemical Corporation, Parsippany, N.J.

[21] Appl. No.: 08/740,603

[22] Filed: Oct. 31, 1996

[51] Int. Cl.$^6$ .................................................... B01D 21/02
[52] U.S. Cl. .................... 210/800; 210/172; 210/241; 210/519; 210/532.1; 137/347; 406/41; 406/175
[58] Field of Search .................... 210/747, 800, 210/153, 172, 241, 519, 532.1, 540; 406/39, 41, 168, 175; 137/1, 347, 546

[56] References Cited

U.S. PATENT DOCUMENTS

| | | | |
|---|---|---|---|
| 2,355,305 | 8/1944 | Koenig | 210/519 |
| 2,531,547 | 11/1950 | Ayres | 210/519 |
| 3,477,688 | 11/1969 | MacCabe | 210/540 |
| 3,759,279 | 9/1973 | Smith, Jr. | 137/1 |
| 3,814,262 | 6/1974 | Nolley, Jr. | 210/519 |
| 4,213,469 | 7/1980 | Pearson | 210/241 |
| 4,377,475 | 3/1983 | Wiedemann | 210/241 |
| 4,389,314 | 6/1983 | Petretti | 210/241 |
| 4,663,039 | 5/1987 | Lindörfer et al. | 210/532.1 |
| 5,021,156 | 6/1991 | Sloan | 210/241 |
| 5,222,512 | 6/1993 | McGregor | 134/166 |
| 5,458,777 | 10/1995 | Khatib | 210/519 |
| 5,660,725 | 8/1997 | Klass | 210/241 |

*Primary Examiner*—Christopher Upton
*Attorney, Agent, or Firm*—Arthur J. Plantamura

[57] ABSTRACT

A railroad tank car can be filled with a slurry of a solid and a solvent therefor. The tank car is fitted with a feed distribution header that is provided with a plurality of predetermined spaced openings. The header is mounted in the car so that after the solids have settled, the solids are located below the distribution header and the supernatant liquid is above the distribution header. The supernatant liquid can then be withdrawn from the tank car through the distribution header and flows back to a storage tank from where it came. All of this can be accomplished with a single pump. Removing or unloading of solids from the car is effected by rendering the solids flowable with a liquor and pumping the solids from the car or dissolving them.

3 Claims, 2 Drawing Sheets

SYSTEM FOR TRANSPORTING SOLID MATERIALS

This invention relates to an improved method of and system for transporting solid materials via tank type railroad cars.

BACKGROUND OF THE INVENTION

Consumers of bulk quantities of soluble solid materials often change to bulk solutions when their processes permit this, because of the ease of unloading and feeding solutions to processing equipment. Depending on the solid's solubility in the solvent used, which is most often water, the solvent weight can be 50 to 75 percent of the total weight of the material. Since transportation costs vary directly with the weight of the material transported, partial or complete removal of the solvent greatly reduces the costs of transportation alone. However, drying to remove the water of solution is also expensive.

Bulk quantities of dry soluble solid materials can be transported via tank type railroad cars and truck tank trailers and unloaded by dissolving the material out of the transport vehicle. This method of unloading is known as sparging. This is less expensive than shipping solutions.

Thus a tank car containing water soluble solids that will be used as a solution can be shipped dry but unloaded at its destination by a sparging process. We refer to U.S. Pat. No. 3,759,279 to Smith, Jr. which unloads dry sugar from a truck tank trailer by dissolving it out of the trailer with heated water. Such tank trailers are fitted with multiple covered openings distributed along the length of the top of the tank for loading dry material into the trailer.

The sparging process entails recirculating that amount of water from a storage tank to the tank car that is needed to dissolve the solids and dilute the resultant solution to the desired concentration. The water for dissolving the solids is pumped into the bottom of the tank car through a distribution header, and flows to the upper outlet of the tank car from which it exits the car and flows to the storage tank. The water is recirculated from the storage tank, from which it again returns to the tank car, until the solids are dissolved. The rate of dissolution generally can be increased if the solution is heated en route to the tank car. If the tank car can be permitted to become slightly pressurized, then only one pump is required to move all of the solutions. Unloading a sparger car can take up to 24 hours. This system for unloading soluble solids has found widespread use.

FIG. 1 illustrates schematically a typical sparger unloading system for a tank car. Referring to FIG. 1, a railroad tank car 12 has an inlet line 14 leading from the bottom of a storage tank 16. The storage tank 16 is loaded with the desired level of water required to dissolve the solids being unloaded. The water at first, and later recirculated solution, is fed from the storage tank 16 through the bottom header 18 of the tank car 12, which contains the solids to be dissolved. the solution leaves the car through an outlet line 20. The tank car dome 22 is closed so the pressure from a pump 24 forces the solution out of the tank car 12 to the top of the storage tank 16. The increase of solution concentration can be monitored by checking the specific gravity of a sample of the returned solution. The tank car 12 can be inspected when the pumping has been stopped and the dome cover 22 is opened. The best indication of complete dissolution would be several successive hydrometer readings with no increase in specific gravity.

To load a tank car so that the solids are fairly distributed in the tank car, multiple domes have been used. In the prior art generally as many as five domes have been installed in a railroad tank car. The cited patent, supra, includes a sketch of a truck trailer with nine openings distributed along the length of the top. This type of car or truck is usually loaded using some type of mechanical conveyor. A specific amount of material is loaded into each opening. The conveyor must be stopped and the car moved to load through each opening to the desired load. In this fashion the car is filled safely to something less than the load limit. Particular care has to be taken not to overload the car. For this system of loading dry products, a costly conveyor system must be installed. If it is overloaded, the excess solids may have to be removed with costly hand labor.

Thus an improved method of loading tank cars with solid materials would be highly desirable.

SUMMARY OF THE INVENTION

We have found that railroad tank cars can be loaded with a predetermined weight of a slurry including soluble solids and aqueous solution directly from the manufacturing process to the transport cars. The transport car is fitted with a loading header containing a plurality of predetermined spaced openings strategically located so that the lower edge of this horizontal header, with its spaced openings, is mounted at the desired average level of the settled solids. In the system of the invention the location of the loading header in the car determines the solids level. If there is an overload, some water is pumped in and the resulting slurry and solution makes it possible for the excess material to be pumped out.

After the loaded slurry is permitted to settle, the clear solution above the loading header is pumped back to the manufacturing process. Most of the liquid which transported the solids into the car is returned to the process with this procedure. About 30% of the solution used to move the solids remains in the interstices between the crystal product. Since transportation costs vary directly with the weight of material to be transported, removal of the solvent, such as water, from the product to be shipped, before shipping, reduces the costs of transportation.

The present system eliminates the need to separate the solids from the mother liquor and then dry them. The loading system utilizes a pump and pipe for loading. By decanting the liquor from the settled solids in the transport car, the net weight of the car contents is much reduced. Moreover, in the system of the invention, there is of course no need to move the car during loading to accommodate various openings on top of the car.

DETAILED DESCRIPTION OF THE INVENTION

Many soluble materials, such as sodium metabisulfite, are first produced in slurry form. Such slurries may be loaded directly into sparger railroad cars and the liquid carrier conveniently recovered from the slurry before shipping in accordance with the present invention.

Sodium metabisulfite, $Na_2S_2O_5$, for example, is commercially produced as a slurry of sodium metabisulfite whose composition is 63% by weight of solids and 37% by weight of water. Sodium metabisulfite, when dissolved in water, hydrolyzes to form sodium bisulfite according to the following reaction:

Sodium metabisulfite has many uses; it is a reducing agent; it is used to remove oxygen from water; it is used to treat chromium in water; it is used for the reduction of chlorine to chloride; it is a sulfonating agent and a mild bactericide. Many of these uses are very substantial and can utilize the material as a solution.

The present invention is very practical and admirably applied to sodium metabisulfite for example for a large scale user who most often takes delivery of bulk 4000 gallon tank truck loads of 39% by weight solution of sodium bisulfite. To do this, the customer need only install a large enough storage tank and a system to deliver the solution to the process. Bulk solutions usually result in selling prices less than the lowest cost of dried and packaged material. But customers of bulk solutions want the kind of service that can only be provided by trucks. Movement by truck is usually much more costly per ton-mile than movement by railroad. As a result, the distance that a load of 39% sodium bisulfite solution can be shipped by truck is limited. Because of this a plant must forego all business beyond a certain radius of the plant.

This invention is intended also to increase the practical operating radius for a plant which makes bulk tank truck solution deliveries.

In accordance with the invention, a manufactured slurry of the sodium metabisulfite salt can be decanted prior to transporting it, greatly reducing the costs of transportation.

Figure 2:
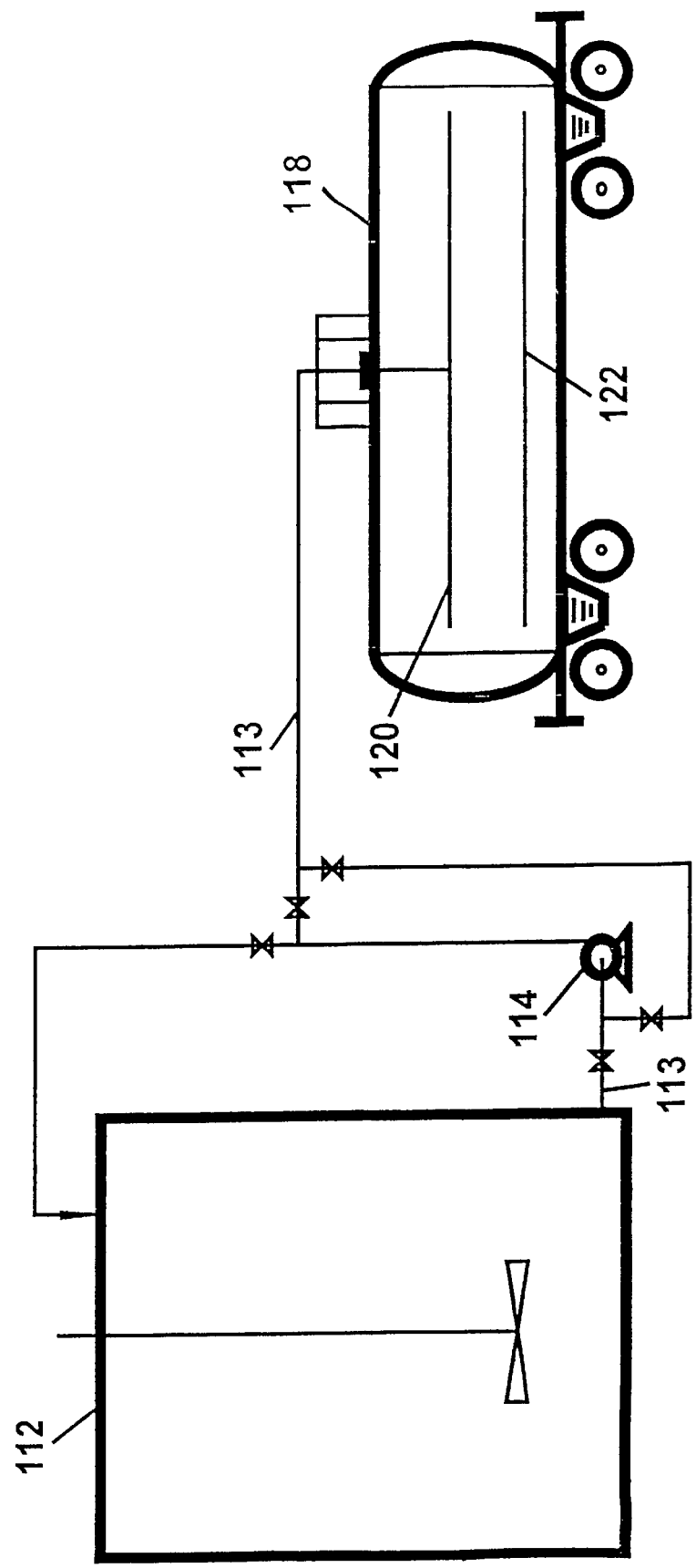
FIG. 2 is a schematic view of a system used to load and unload railroad tank cars with a slurry in accordance with the system of the present invention.

In accordance with the invention and referring to FIG. 2, a slurry of a soluble solid in a storage tank 112 is pumped via line 113 by means of a pump 114 to the top of the sparger car 118, which is fitted with a horizontal loading distribution header 120 that has uniformly sized and spaced openings at its bottom so that it will distribute the solids in a level fashion. The size and spacing of the header openings will be specific for any given product slurry. The amount of the slurry and the position of the loading distribution header 120 in the car 118 are preselected so that a) the car is not overloaded when the supernatant liquid is removed; and b) the liquid is above the distribution header 120 while the solids are at the level of the bottom of the header 120. After the solids have settled, the supernatant liquid and any excess solids are pumped or dissolved out of the car 118. The mother liquor removed from the car 118 can be returned to the manufacturing process.

When the solids settle, their average level will be near the bottom of the distribution header 120. Because there is more accumulation of solids directly under the header openings, the solids will not be perfectly level, but these variations will not be significant. This system avoids the need for centrifuging and drying the solids before loading for shipment and permits accurate, easy and inexpensive loading; removes much of the liquid and significantly reduces transportation costs as compared to transporting solutions. The present system avoids the need to dry a product sufficiently so that it is capable of being packaged by flowing the dried product into a shipping container.

The loading distribution header 120 should be mounted at the desired level of solids so that the weight of solids and the remaining liquor does not exceed the load limit for the car. This level will be specific for each product because of differences in the density and size of the solids shipped; and for each car because of varying dimensions of the car. If insufficient solids are at first loaded into the car, additional slurry can be pumped to the car, the solids allowed to settle and the supernatant liquid drawn off. If too much solids have been loaded, mother liquor or water can be pumped in through the distribution header 120 and then pumped out before settling occurs. A similar procedure can be used to correct poorly distributed solids in a car.

The openings in the loading header 120 should be large enough so they will not tend to plug. Differences in spacing of the holes are needed to produce a reasonably level load because pressure and velocity in the header are reduced as the slurry reaches the ends of the header 120.

Figure 1:
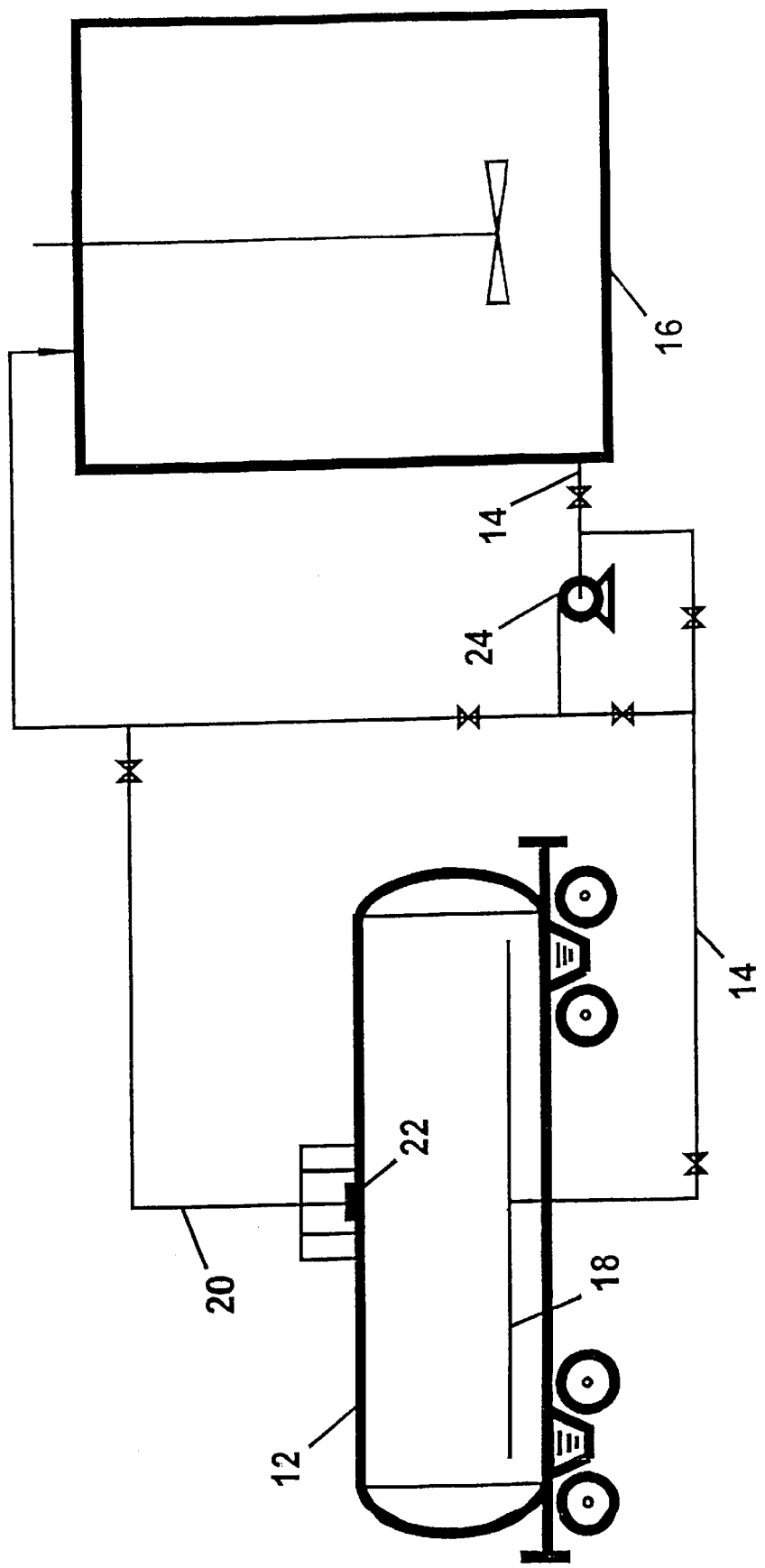
FIG. 1 is a schematic view of a system used to unload railroad tank cars containing soluble dry solids in accordance with the prior art.

After arrival of the sparger car 118 at its destination, the car 118 is unloaded in conventional manner as described above with respect to FIG. 1. About one and one-half times the weight of the solids of water, in the case of sodium metabisulfite, is needed to dissolve the soluble solids in the car. The storage tank is prefilled with the required amount of water, which is then pumped to the dissolving header 122 which is located in the car near its bottom. The solution percolates upward through the solids or loosens the solids to a flowable state and dissolves them. The solution or slurry exits the car through the distribution or upper header 120. It can take up to about 24 hours to dissolve or render the solids in a flowable slurry and to unload all of the solids in a car. The time for unloading thus is dependent on the physical and chemical properties of the solids to be dissolved.

In cold weather, warm water or steam can be fed to the bottom of the filled tank car to aid in dissolving the solids. The warm solution is recirculated until the solids are all dissolved or loosened to a flowable slurry state. If a car is frozen, the dome may be opened and steam only fed into the dissolving header. When steam escapes from the dome of the car, it indicates that a passageway has been thawed through the frozen solids in the car. The dome can then be closed for recirculation of heated solution through the solids in the car. In the coldest weather the recirculated solution will be continually heated to maintain its temperature and to speed up the unloading.

The method of loading of the present invention has several distinct advantages; the slurry solids do not have to be centrifuged, dried, or screened for shipment. No conveyor for moving the solids is required since the slurry can be conveniently and efficiently pumped through a pipe. No dust is formed or emitted as when dry solids are loaded into bulk cars. Loading as a slurry is faster than loading as a dry product; and the solids can be loaded and unloaded with a single pump system.

Although the present invention has been described in terms of certain embodiments, such as sodium metabisulfite solids in sodium bisulfite solution, it is readily apparent that other materials and transport containers can be used as will be obvious to those skilled in the art. Other materials are commercially produced as a slurry, such as sodium sulfite, sodium thiosulfate and sodium nitrite. These slurries can also be used in the present process simply by locating the distribution header in the tank car at the appropriate level and by adjusting the size of the openings in the header and their spacing to meet the needs of these products.

These and other variations known to those skilled in the art are meant to be included herein and the invention is only to be limited by the scope of the appended claims.

We claim:

1. A system for loading solids for transport to a remote location comprising:

a) a tank car including an inlet pipe for a slurry; and b) a horizontal feed distribution header within said tank car, said header, positioned above solids to be transported in the tank car and extending substantially the length of the tank car and containing a plurality of spaced openings at the bottom of the header, said header being located at a preselected position such as to be at an elevation determined by the weight of the solids to be transported, said header being functionable to remove the supernatant liquid from the slurry, thereby permitting a loading of the car with a predetermined acceptable shipping weight that fills the space below the distribution header.

2. The system of claim 1 including means to unload solids from said tank car by introducing a liquid to render the solids in a flowable state and to permit said solids to be withdrawn by pumping said solids from the car.

3. A method of loading a railroad tank car with a slurry of solid material comprising a) providing a feed distribution header with said tank car, said header including a plurality of spaced openings;

b) locating said distribution header in the car so that after the slurry has settled, the solids are at the level of, and the supernatant liquid is above, the header;

c) loading the tank car with a predetermined quantity of said slurry;

d) allowing said slurry to settle in the tank car; and e) drawing off the supernatant liquid from the car through the distribution header.

* * * * *